(12) United States Patent
Chidley et al.

(10) Patent No.: US 6,318,168 B1
(45) Date of Patent: Nov. 20, 2001

(54) THERMAL DISPERSION PROBE WITH MICROCOMPUTER CONTROLLER

(75) Inventors: Paul Edward Chidley; Brian Leslie McClelland, both of Calgary (CA)

(73) Assignee: Kayden Instruments Inc. (CA)

( * ) Notice: Subject to any disclaimer, the term of this patent is extended or adjusted under 35 U.S.C. 154(b) by 0 days.

(21) Appl. No.: 09/232,166

(22) Filed: Jan. 15, 1999

(51) Int. Cl.[7] ............................... G01F 1/68; G08B 29/00
(52) U.S. Cl. ............................ 73/204.15; 73/204.16; 340/515
(58) Field of Search ..................... 73/204.11, 204.15, 73/204.17, 204.16; 340/515

(56) References Cited

U.S. PATENT DOCUMENTS

| | | | |
|---|---|---|---|
| 4,478,077 | * 10/1984 | Bohrer et al. | 73/204.16 |
| 4,688,424 | * 8/1987 | Handtmann et al. | 73/204.16 |
| 5,419,187 | 5/1995 | Uchiyama | 73/118.2 |
| 5,434,555 | 7/1995 | Haynes | 340/515 |
| 5,495,130 | 2/1996 | Schneider | 307/118 |
| 5,525,040 | 6/1996 | Andreae et al. | 73/204.11 |
| 5,600,528 | 2/1997 | McQueen | 361/103 |
| 5,629,482 | 5/1997 | Vaitkus et al. | 73/204.24 |
| 5,753,815 | * 5/1998 | Murata | 73/204.15 |
| 5,780,737 | 7/1998 | Wible et al. | 73/204.22 |

FOREIGN PATENT DOCUMENTS

| | | | |
|---|---|---|---|
| 176996 | 4/1986 | (EP) | G01F/1/68 |
| WO 91/19170 | 12/1991 | (WO) | G01F/1/68 |

* cited by examiner

Primary Examiner—Harshad Patel
(74) Attorney, Agent, or Firm—Hayes, Soloway, Hennessey, Grossman & Hage, P.C.

(57) ABSTRACT

Thermal dispersion probes used as flowrate sensors in process control of a medium heated by a heater. The device includes a reference temperature sensor for producing an electrical signal indicative of the temperature of the medium in which it is immersed, and an active temperature sensor for producing an electrical signal indicative of the temperature of the medium adjacent the heater. The temperature difference between the active sensor and the reference sensor is processed in a processor which varies the heater power to maintain the temperature differential between the active sensor and the reference sensor within a predetermined range, whereby the predetermined range provides an optimal sensitivity for the probes.

6 Claims, 2 Drawing Sheets

THERMAL DISPERSION PROBE WITH MICROCOMPUTER CONTROLLER

FIELD OF THE INVENTION

The present invention relates to a thermal dispersion probe, and more particularly to thermal dispersion probes used as flow rate sensors in process control.

BACKGROUND OF THE INVENTION

A thermal dispersion probe typically includes two thermowell-protected RTD's (Resistance Temperature Detectors) which are placed into a medium (air, gas, liquids, slurries or solids) to be monitored. One RTD is preferentially heated while the other RTD senses the temperature of the medium, the temperature differential of the two RTD's is related to the medium flow rate as well as the properties of the medium. The principle of operation of the probe is based on the rate of dispersion of thermal energy from the heated RTD by the medium. As the flow-rate of the medium increases, more of the heat created by the heater by the heater is carried away resulting in a reduction of the temperature differential between the sensors. Using a well-known mathematical formula, the device uses the temperature differential between the RTD's to determine the flow rate of a particular medium or, given a constant flow rate, can determine the type of medium being measured. This data is then processed by devices such as a computer to effect control systems. The device may be utilized in virtually any condition as it may be paired with external software controls which can be downloaded into the device.

Current designs offer a single heater setting for the entire range of the RTD's, these designs cannot intelligently allocate the proper amount of thermal energy required in all necessary instances as it is either 'full on' or 'full off'. 'Full on' results in wasted energy when the sensor is located in a medium of low specific gravity and additionally results in very slow response times to major changes in the medium movement or composition. Additionally, when physical jumpers are utilized to select heater power for specific sections of the flow spectrum, it unwittingly restricts the spectrum of the sensors' range. Any significant change in medium will require operator intervention.

In other words, current flow rate measurements may not be as accurate as necessary if the flow rate is either very high or very low. The heat source in the probe is designed to operate for all rates of flow. If the flow-rate is very high, most of the heat created by the heat source will be removed by the first flowing fluid before the thermistor has a chance to measure it. Therefore, small changes in the flow-rate at this end of the spectrum may not be noticed. Similarly, if the flow-rate is very low, most of the heat generated by the heat source will be measured by the thermistor. Too much heat has the same effect on the results as too little heat in that the smaller changes is flow may go unnoticed. Accordingly, where large fluctuations in flow rate are encountered, accurate measurements over the whole range is difficult.

Another shortcoming of present thermal dispersion switches is the lack of appropriate methods to test the switch to ensure it is operating properly. Even those switches that do provide a self-test still require some operator intervention. Therefore, a malfunction of the switch can still go undetected until the next scheduled operator test.

It is an object of the present invention to obviate or mitigate at least some of the above disadvantages.

SUMMARY OF THE INVENTION

In general terms, the present invention provides a thermal dispersion switch in which a heat source is controlled by a switch having a variable duty cycle to provide a variable heating effect.

The variable heat source that is designed to self-adjust for all level and interface applications and all rates of flow. By self-regulating the energy used by the heater in this invention, the microcomputer within the device optimizes the heater settings for all the different fluids and gases found in flow and level applications. When the heater is provided with only the appropriate amount of energy needed to yield the required differential, the sensitivity and response rate of the switch is optimized and maintained without operator intervention. In addition by reducing the amount of energy drawn form the power source in low flow, and level applications, the switch uses less power and is more environmentally sensitive.

In accordance with this invention there is provided A thermal dispersion probe for measuring the flowrate of a medium comprising; heater for heating said medium at a predetermined power; temperature sensor for producing a temperature signal indicative of a temperature difference between an active sensor and a reference sensor; processor for varying said heater power to maintain the temperature differential between the active sensor and the reference sensor within a predetermined range, whereby the predetermined range provides an optimal sensitivity for the probe.

BRIEF DESCRIPTION OF THE DRAWINGS

An embodiment of the invention will now be described by way of example only, with reference to the accompanying drawings in which.

DETAILED DESCRIPTION OF THE PREFERRED EMBODIMENT

Figure 1:
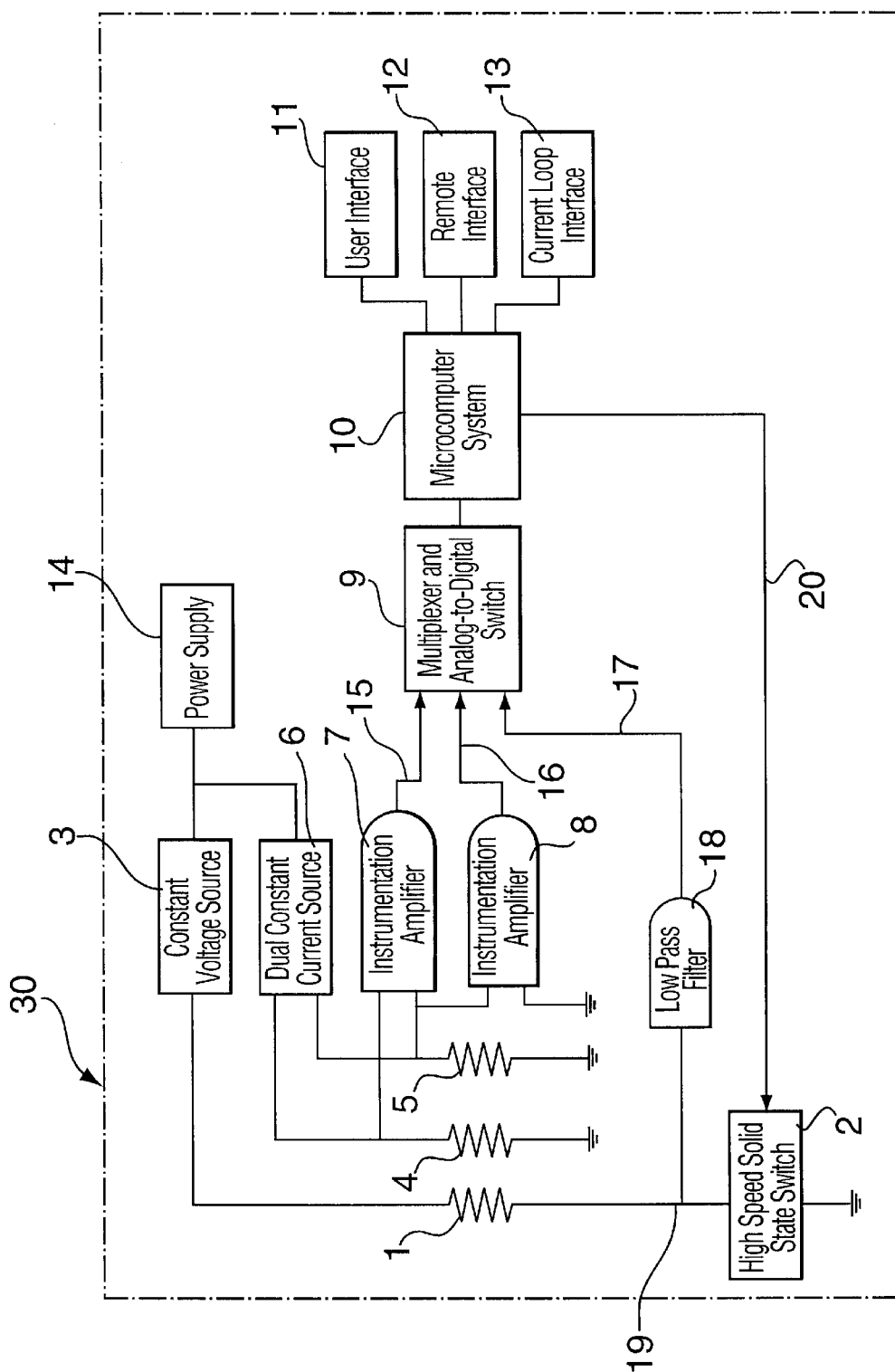
FIG. 1 is a schematic diagram of a thermal dispersion probe.

For convenience in the following description, like numerals refer to like structures in the drawings.

Referring to FIG. 1, a thermal dispersion probe 30 includes a constant voltage source 3, dual constant current sources 6 as well as its operating voltage derived from a power supply 14.

A heat source 1 is powered be the constant voltage source 3 and controlled by a high-speed solid state switch 2. Temperature-sensing devices, such as an RTD, are located in the circuit, and include an active temperature sensing element 4 and a reference temperature sensor 5. A current is fed into both the active temperature sensing element 4 and the reference temperature device 5 from the dual constant current source 6 which results in a voltage across the active temperature sensing element 4 and the reference temperature sensor 5.

The voltage difference between the two elements, 4 and 5, is amplified by an instrumentation amplifier 7. The output voltage from the instrumentation amplifier 7 will be referred to as the thermal signal 15.

The voltage across the reference temperature device 5 is amplified by the instrumentation amplifier 8 to produce a voltage that represents the medium's temperature. The output voltage from the instrumentation amplifier 8 will be referred to as the temperature signal 16.

A low pass filter 18 is connected between the heating element 1 and the switch 2. The filter 18 acts to average its input signal 19 and provide an output voltage. The output voltage from the low pass filter 18 will be referred to as the heater signal 17.

Each of the signals 15, 16, 17 is supplied as inputs to a Multiplexer and Analog-to-Digital System 9 which selects alternately one of the signals as an input and converts it from an analog signal to a digital signal.

The A/D System 9 provides a digital input to a microcomputer system 10 which is connected to the high speed solid state switch 2 in order to control its operation using a pulse width modulated signal. Other outputs of the microprocessor 10 are also sent to a user interface 11, the remote interface 12, and the current loop interface 13.

The user interface 11 consists of a display for sending information to a user and a keypad for receiving information from a user. The information input by the user is used by the microcomputer 10 to determine the desired operation of the unit. Many applications, for example in hazardous environments, prohibit the user from using the user interface 11. The remote interface 12 is provided for a user to monitor or control the unit from a remote location. The remote interface 12 consists of physical such as RS-232 or RS-485 and a data interface such as Modbus. For any applications requiring an analog output, a current loop interface 13 is provided. The current loop interface 13 sinks a current between four and twenty milliamps to represent the thermal signal 15. The relationship between the thermal signal 15 and the output of the current loop interface 13 is determined by variables entered by the user via one of the user interfaces 11 or 12.

In operation, the thermal energy generated by the heat source 1 is transferred through the medium being monitored to the active temperature-sensing element 4. The thermal energy being produced by the heat source 1 and how much of that energy is absorbed by the active temperature sensor 4 versus being absorbed by the surrounding medium. The amount of energy that is absorbed by the medium depends on both the nature of the medium itself and the flow-rate of that medium. For example, quiescent isothermal water will absorb more thermal energy from the heater 1 than quiescent isothermal air would, and fast moving isothermal water would absorb more than slow moving isothermal water. Likewise, a fast flowing medium will disperse a relatively large amount of heat away from the active temperature-sensing element 4 whereas a slow moving medium will disperse relatively little heat away from the temperature-sensing element 4. Therefore, the smaller the thermal signal 15 the faster the flow-rate of the medium. Conversely, and the larger the thermal signal 15 the slower the flow-rate of the medium. The thermal signal 15 can be used to indicate the flow rate of a known medium or if the flow rate is constant it can be used to indicate the type of medium.

The reference temperature device 5 is relatively unaffected by the thermal energy produced by the heat source 1 so the voltage across it is an indication of the medium's temperature. One example as to how this may be accomplished is to place the reference temperature device at a sufficient distance from the heater. Another example is to place the reference temperature device upstream from the heater. These are just two of a multitude of possible solutions. The voltage across the reference temperature device is amplified by the instrumentation amplifier 8 which yields the temperature signal 16. The difference in signals 15, 16 received from the reference temperature device 5 and the active temperature-sensing element 4 is used by the Microcomputer 10 to determine the flow-rate of the medium.

The microcomputer system 10 sends a pulse width modulated signal 20 to the high-speed solid state switch to control the amount of thermal energy produced by the heat source 1. Essentially, since the frequency remains constant, the signal 20 controls how long the switch stays on by varying the duty cycle. When the switch 2 is on, the heat source 1 is activated and produces heat. When the switch 2 is off, the heat source 1 is not activated and is not generating any heat. Therefore by controlling the length of time the switch 2 stays on per cycle, the microcomputer 10 is effectively creating a variable heat source 1. The appropriate settings of such a heat source depend on a number of conditions.

Figure 2:
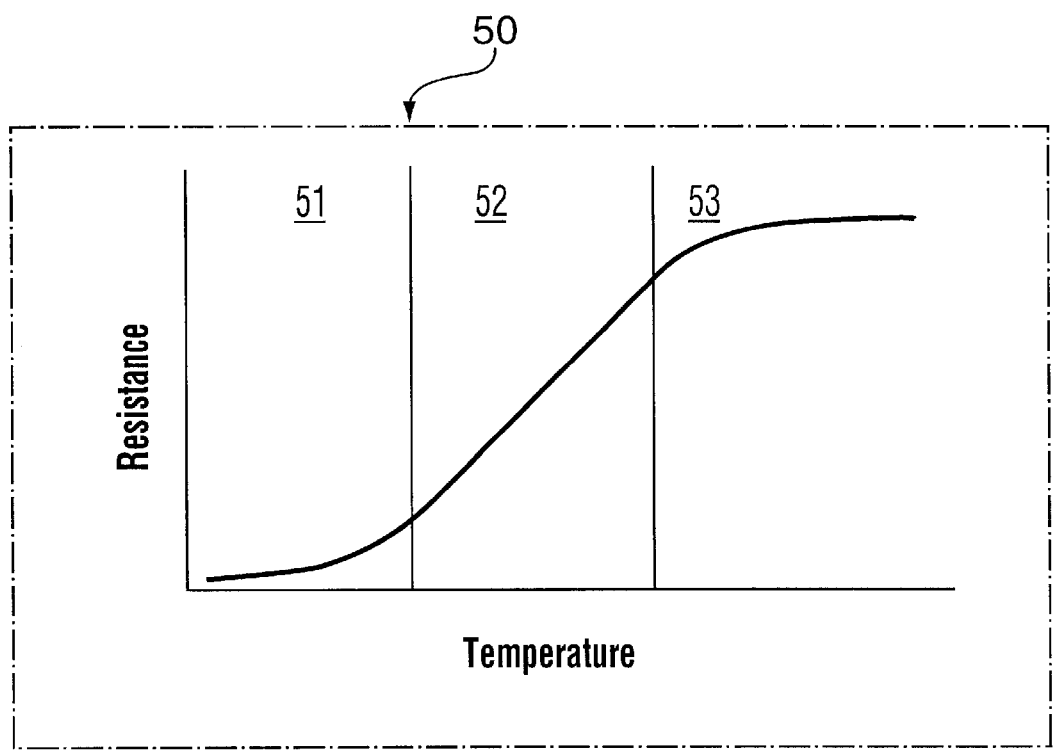
FIG. 2 is a graph representing the behavior of a resistive device that changes resistance with temperature.

If, for example, the flow-rate of the medium is very slow, then there will be a large proportion of the heat generated by the heat source 1 transferred to the temperature-sensing element 4. Referring to FIG. 2, the behaviour of a resistive device that changes resistance with temperature is represented generally by 50. If the heat source 1 is generated a lot of heat then the temperature-sensing element 4 may be operating outside of its linear region as indicaated by reference number 53. Therefore, significance changes in the flow-rate will not be accurately represented by the temperature-sensing element since large changes in temperature will result in smaller than usual changes resistance. Similarly, if the flow-rate of the medium is very fast, very little of the heat generated by the heat source 1 will be transferred to the temperature-sensing element 4. There will be no way of knowing if any of the heat generated by the heat source reaches the temperature sensing element 4 and the flow-rate continues to increase. Similarly, if the flow-rate of the medium is very fast, very little of the heat generated by the heat source 1 will be transferred to the temperature-sensing element 4. There will be no way of knowing if any of the heat generated by the heat source reaches the teare sensing element 4 and the flow-rate continues to increase.

To establish the operation of the switch in the linear range, the microcomputer system 10 uses the difference between thermal signal 15 and the temperature signal 16 to determine whether or not the heat source 1 needs to generate more or less heat. As the difference between the two signals increases it signifies that the flow-rate of the medium is slowing down. When the difference passes certain predetermined threshold, the Microcomputer 10 realizes that the heat generated by the heat source1 needs to reduced and reduces the duty cycle of the pulse width modulated signal 20. This action in turn reduces the length of time the switch 2 stays on per cycle, which reduces the heat generated by the heat source 1. The active temperature sensing element remains in the linear region 52 and changes in the flow-rate are measured accurately. If, howevr, the thermal signal 15 drops below a certain level, the Microcomputer 10 realizes that the heat source 1 needs to generate more heat and increases the duty cycle of the pulse width modulated signal 20. The switch 2 will remain on longer than it previously had, increasing the heat generated by the heat source 1. The additional heat can now read the active temperature sensing element 4 to allow for an accurate reading rather than simply being swept away by the rapidly moving medium.

Since the high speed solid state switch 2 is effectively an open or closed circuit the voltage present at the input 19 to the low pass filter 18 will be either zero or the voltage output from the constant voltage source 3. However the switch is controlled by the microcomputer system 10 using a pulse width modulated signal 20 at a fixed frequency. This frequency is much higher than the cut off frequency of the low pass filter 18. The resulting output, the heater signal 17, from the low pass filter 18 is a voltage that represents a ratio of how long the switch is on to how long the switch is off. This signal is used to monitor the heater element as part of the units self-test.

The microcomputer 10 is designed to periodically test the heat source 1, the active temperature-sensing element 4, and the reference temperature sensor. The tests are accomplished by testing the thermal signal 15, the temperature signal 16, and the heater signal 17. All three of the signals are sent to the Multiplexer and Analog-to-Digital converter system 9 that converts the selected signal to a digital format and feeds it to the Microcomputer 10. If the value of the temperature signal 16 is a full scale or zero reading, then there is an error with the reference temperature sensor 5. If the temperature signal 16 is valid and the thermal signal 15 is full scale or zero, then there is an error with the active temperature-sensing element 4. Since the heater signal is a voltage that represents a ratio of how long the switch 2 is on to how long the it is off, the Microcomputer 10 knows what this ratio should be since it controls the switch 2 via the pulse width modulated signal 20. Therefore, if the heater signal 17 has an incorrect value, there is an error with the heat source 1 or the switch 2.

the subject configuration thus allows the dispersion switch to more accurately analyze a particular range of flow-rates. If the flow-rates get too close to either end of the range, the range can be shifted so that the flow-rate calculations are not compromised. The microcomputer 10 also provides a self-testing feature that requires no input from an operator. The self-test is performed at regular intervals throughout the lifetime of the switch.

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. A thermal dispersion device, comprising:
    a reference temperature sensor for producing a first electrical signal representative of the temperature of a medium in which said reference sensor is immersed;
    a heating element;
    a constant power source connected to said heating element;
    an active temperature sensor located proximate said heating element for producing a second electrical signal representative of the temperature of said medium proximate that in which said active sensor and said heating element are immersed;
    a constant current source connected to each said active and reference sensor for applying a constant current thereto;
    means for receiving said first and second electrical signals and producing a thermal signal representative of the difference in the magnitude of said first and second electrical signals; and
    circuit means responsive to the magnitude of said thermal signal for controlling the amount of heat produced by said heating element so as to maintain the difference between said first and second electrical signals between predetermined upper and lower limits, said circuit means including:
        switch means in series with said heating element and being responsive to a pulse width modulated control signal having a duty cycle for cyclically activating and de-activating said heating element;
        first and second amplifiers for amplifying said thermal signal and second electrical signal, respectively;
        means for digitizing said thermal signal and said second electrical signal; and
        a microprocessor for receiving digitized thermal and second electrical signals and generating said pulse width modulated control signal, said microprocessor being operative to incrementally increase the duty cycle of said pulse width modulated control signal when said difference falls below said lower limit and incrementally decrease said duty cycle of said pulse width modulated control signal when said difference rises above said upper limit.

2. A thermal dispersion device as defined in claim 1 further including a low pass filter connected to the output of said heating element for producing a heater signal representative of the ratio of ON and OFF intervals of said heating element, said circuit means being operable to compare said heater signal with a predetermined heater signal and issue an error signal when heater signal does not match said predetermined heater signal.

3. A thermal dispersion device as defined in claim 2 further including a multiplexer for cyclically and sequentially applying each said first and second temperature signal, thermal signal and heater signal to said means for digitizing, said microprocessor being operable to read each digitized signal, compare said digitized signals with predetermined values and issue an error message when any one of said digitized signals do not agree with said predetermined values.

4. A thermal dispersion device as defined in claim 1 further including a user interface to enable a user to selectively set said upper and lower limits.

5. A thermal dispersion device as defined in claim 1 further including a user interface to enable a user to remotely set said upper and lower limits.

6. A thermal dispersion device, comprising:
    a reference temperature sensor for producing a first electrical signal representative of the temperature of a medium in which said reference sensor is immersed;
    a heating element;
    a constant power source connected to said heating element;
    an active temperature sensor located proximate said heating element for producing a second electrical signal representative of the temperature of said medium proximate that in which said active sensor and said heating element are immersed;
    a constant current source connected to each said active and reference sensor for applying a constant current thereto;
    means for receiving said first and second electrical signals and producing a thermal signal representative of the difference in the magnitude of said first and second electrical signals; and
    circuit means responsive to the magnitude of said thermal signal for controlling the amount of heat produced by said heating element so as to maintain the difference between said first and second electrical signals between predetermined upper and lower limits, said circuit means including:
        switch means in series with said heating element and being responsive to a pulse width modulated control signal having a duty cycle for cyclically activating and de-activating said heating element;
        first and second amplifiers for amplifying said thermal signal and second electrical signal, respectively;
        means for digitizing said thermal signal and said second electrical signal; and
        a microprocessor for receiving digitized thermal and second electrical signals and generating said pulse width modulated control signal, said microprocessor being operative to incrementally increase the duty cycle of said pulse width modulated control signal when said difference falls below said lower limit and incrementally decrease said duty cycle of said pulse width modulated control signal when said difference rises above said upper limit;

a low pass filter connected to the output of said heating element for producing a heater signal representative of the ratio of ON and OFF intervals of said heating element, said circuit means being operable to compare said heater signal with a predetermined heater signal and issue an error signal when heater signal does not match said predetermined heater signal;

a multiplexer for cyclically and sequentially applying each said first and second temperature signal, thermal signal and heater signal to said means for digitizing, said microprocessor being operable to read each digitized signal, compare said digitized signals with predetermined values and issue an error message when any one of said digitized signals do not agree with said values;

further including a user interface to enable a user to electively set said upper and lower limits; and further including a remote user interface to enable a user to remotely set said upper and lower limits.

* * * * *